United States Patent [19]

Auracher et al.

[11] 4,136,439

[45] Jan. 30, 1979

[54] METHOD FOR THE PRODUCTION OF A LIGHT CONDUCTOR STRUCTURE WITH INTERLYING ELECTRODES

[75] Inventors: Franz Auracher, Munich; Ralf Kersten, Rottach-Egern, both of Germany

[73] Assignee: Siemens Aktiengesellschaft, Berlin & Munich, Germany

[21] Appl. No.: 783,751

[22] Filed: Apr. 1, 1977

[30] Foreign Application Priority Data

Apr. 6, 1976 [DE] Fed. Rep. of Germany ....... 2614871

[51] Int. Cl.$^2$ ..................... H01P 11/00; G02F 1/03
[52] U.S. Cl. ................................. 29/624; 350/96.12
[58] Field of Search ............... 29/624, 622; 350/96 C, 350/96 WG, 96.12, 96.13, 96.14

[56] References Cited

U.S. PATENT DOCUMENTS

| 3,575,745 | 4/1971 | Hill | 29/624 |
|---|---|---|---|
| 3,673,679 | 7/1972 | Carbajal | 29/578 |
| 3,936,144 | 2/1976 | Caton | 350/96 C |
| 3,967,878 | 7/1976 | Caton | 350/96 C |
| 4,005,927 | 2/1977 | Caton | 350/96 C |

OTHER PUBLICATIONS

Uehara, S., et al., "Optical Intensity Modulator With Three-Dimensional Waveguide", from Applied Physics Letters, vol. 26, No. 6, 3/15/75, American Institute of Physics, N.Y., N.Y., pp. 296-298.

Kaminow, I. P., et al., "Efficient Strip-Waveguide Modulator", from Applied Physics Letters, vol. 27, No. 10, 11/15/75, American Institute of Physics, N.Y., N.Y., pp. 555-557.

*Primary Examiner*—C. W. Lanham
*Assistant Examiner*—Daniel C. Crane
*Attorney, Agent, or Firm*—Hill, Gross, Simpson, Van Santen, Steadman, Chiara & Simpson

[57] ABSTRACT

A method for producing a light conductor structure having a pair of light conductors embedded in a substrate of an electro-optical material and having an electrode arranged between the light conductors, which structure is particularly adapted to be used as an electrically controllable coupler, characterized by providing a substrate, applying electrodes to the desired surface area of the substrate, and then producing the light conductors by doping the substrate utilizing the electrodes as a doping mask. Preferably, the electrodes are applied by covering the entire surface of the substrate with the metal layer or with an adhesive layer followed by a metal layer, applying a photo lacquer layer on the metal layer, exposing the photo lacquer layer with an appropriate mask, developing the photo lacquer layer to expose portions of the metal layer in the areas where the electrodes are not desired, etching the exposed portions of the metal layer and the underlying adhesive layer to expose surface areas of the substrate in the area where the light conductors are to be formed.

13 Claims, 7 Drawing Figures

METHOD FOR THE PRODUCTION OF A LIGHT CONDUCTOR STRUCTURE WITH INTERLYING ELECTRODES

BACKGROUND OF THE INVENTION

1. Field of the Invention

The present invention is directed to a method for the production of a light conductor structure which has an electrode arranged between the light conductors.

2. Prior Art

Light conducting structures, which have a pair of light conductors on a substrate with an electrode disposed therebetween, are known. Such structures are used as electrically controllable directional couplers in optical communication technology and act as on/off switches or cross-over switches. In addition such structures are used as electro-optical modulators.

A common feature of these structure is that the two light conductors possess a zone in which they are very closely adjacent to one another. Electrodes are arranged in this zone between the light conductors and besides each of light conductors. In this zone, a typical value for the spacing between the pair of light conductors is 3 $\mu$m. This means that the electrodes must be precisely aligned in their position and that permissible tolerances in the location of the electrodes are less than 1 $\mu$m.

A switch, which can be used as a modulator and which comprises two coupled light conductors which can be detuned relative to one another by applying an electrical field of the conductors, is disclosed in the article by H. F. Taylor, "Optical Switching and Modulation in Parallel Dielectric Waveguides," J. Appl. Phys., Vol. 44, No. 7, July 1973, pp. 3257–3262.

If the two light conductors are arranged so that they are closely adjacent over a sufficiently long path, they are optically coupled to one another. For example, in a coupling length L, a periodic change of optical energy takes place between the two conductors. If both light conductors are loss-free and their phases are matched to one another, the energy exchange is complete. If, however, the propagation constant for the light changes asymmetically in the light conductors, only a part of the energy is exchanged. Furthermore, there is also a change in the coupling length L over which the maximum exchange of energy will occur.

If the light conductors are produced from an electro-optical material, it is possible to control the index of refraction and thus the propagation constants in the light conductors by applying an electrical field to the light conductors. The coupling strength, which is dependent upon the distance between the intercoupled light conductors, upon the refractive indices of the light conductors, and the coupling length L, is selected to be such that when no electrical field is applied, the energy from one light conductor is completely coupled to the other light conductor. By applying an electrical field to the light conductors, the propagation constants of the two light conductors are detuned relative to one another in such a manner that for a given coupling length L, a part of the optical energy is first coupled into the other light conductor and then is coupled back again.

An example of a known type of light conductor structure or device is a modulator which is illustrated in FIG. 1 and generally indicated at 9. The modulator 9 includes a substrate 1, which consists of an electro-optical crystal, for example, lithium niobate (LiNbO$_3$) and which has light conductors 2 and 3 which are arranged closely adjacent to one another along a coupling length L. The light conductors 2 and 3 are produced by diffusing a metal such as titanium or nickel into the selected areas of the substrate to increase the index of refraction of the substrate in the doped zones. An electrode 5 is located between the light conductors 2 and 3 and electrodes 4 and 6 are located beside each of the light conductors 3 and 2, respectively. By connecting the electrodes 4, 5 and 6 to voltage sources such as 7 and 8, it is possible to alter the optical properties of the light conductors 2 and 3.

However, when a central electrode 5 is arranged between the two light conductors 2 and 3, particular difficulties will occur. These difficulties are due to the fact that the distance between the coupled light conductors 2 and 3 is only between 1 $\mu$m and 3 $\mu$m and due to the fact that the central electrode 5 must be positioned as exactly as possible between the light conductors 2 and 3. Thus, the tolerances for the position of the electrode 5 are extremely small.

SUMMARY OF THE INVENTION

The present invention is directed to a method of providing a light conductor structure in which an electrode is arranged between the light conductors and electrodes are arranged adjacent each side of the light conductors. The process eliminates the expenses and problems for obtaining the desired positioning of the electrodes relative to the light conductors.

To accomplish this aim, the process comprises the steps of providing a substrate, applying metal electrodes to the surface of the substrate in the desired area, and then doping the substrate to produce the light conductors by using the electrodes as a doping mask.

The doping may be by diffusing material into the surface of the substrate which is left exposed by the electrodes and this advantageously automatically achieves an optimum adjustment between the position of the light conductors and the electrodes. The forming or definition of the electrodes on the substrate is advantageously accomplished by using a photolithographic process.

DESCRIPTION OF THE PREFERRED EMBODIMENTS

Figure 1:
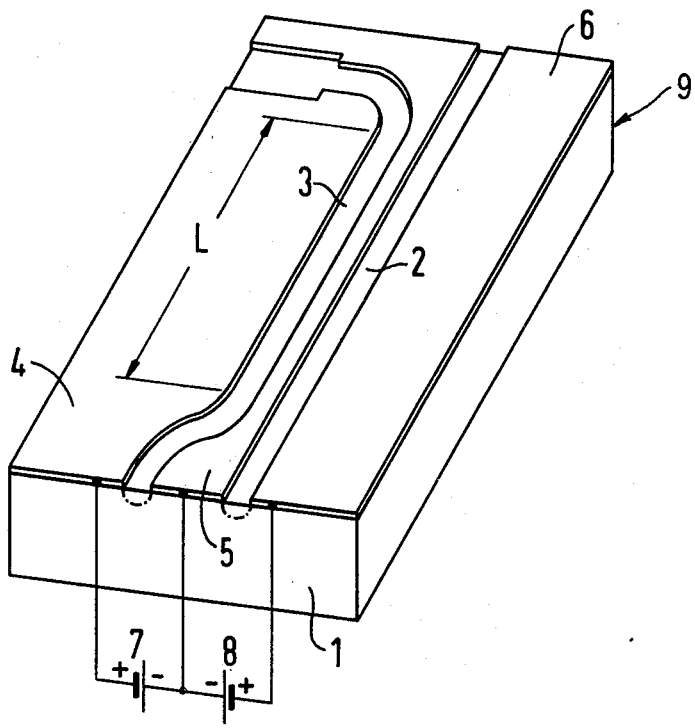
FIG. 1 is a perspective view of a light conductor structure produced in accordance with the present invention.

The principles of the present invention are particularly useful for producing a light conductor structure or device such as the modulator generally indicated at 9 in FIG. 1.

Figure 2:
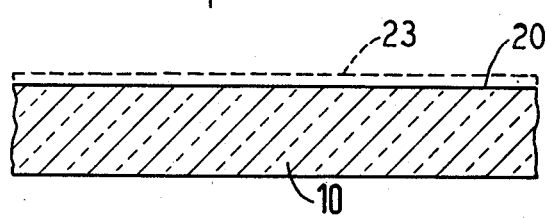
FIGS. 2–7 illustrate the various steps of the preferred method for producing the substrate of the light conducting structure in accordance with the present invention.

To produce the structure or device 9, the method of the present invention comprises providing a substrate 10 (FIG. 2), which has a surface 20. The substrate 10 is in the form of a crystal composed of electro-optical material, for example lithium niobate (LiNbO$_3$), which crystal is cut in such a manner that the crystallographic main axis (c-axis) lies in the plane of the surface 20 and perpendicular to the direction of propagation of light in the later formed light conductors. Instead of using lithium niobate as the crystal for the substrate 20, it is possible to use a crystal consisting of lithium tantalate (LiTaO₃).

After the step of providing the substrate 10, the next step consists in applying metal electrodes on the surface 20 of the substrate 10. The application of the electrodes on the surface 20 can be accomplished by a direct metallization of the surface 20 by applying a metal layer 12 directly on the surface 20. The metal layer 12 will have a thickness of, for example, 300 nm and the metal will be selected from a group consisting of gold, titanium, nickel-chromium, and platinum.

Figure 3:
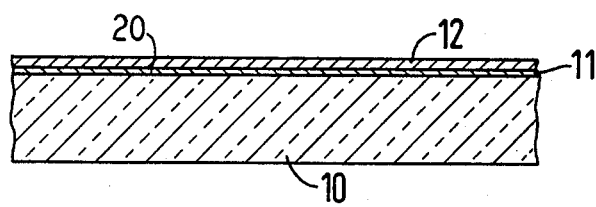

As illustrated in FIG. 3, in order to increase the adhesive strength of the layer 12 on the surface 20 of the substrate 10, an adhesive layer 11 is first applied to the surface 20 prior to applying the metal layer 12. This adhesive layer will have a thickness in the range of 5 to 10 nm and will be of a material selected from a group consisting of titanium, chromium, niobium nickel-chrome compounds and nickel-chrome alloys. The adhesive layer 11 and the metal layer 12 can each be applied to the surface 20 of the substrate, for example, by vapor depositing, spraying, atomizing or sputtering.

Figure 4:
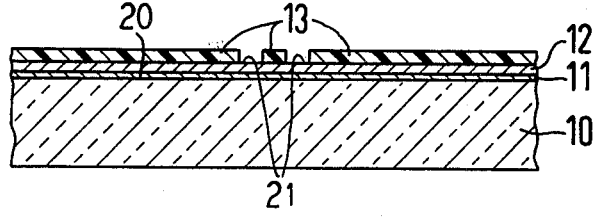

The shaping or further processing of the metallized layer, which may comprise the single metal layer 12 or composite layers 11 and 12, to form the electrodes, is the next step of the method. This can be carried out photolithographically. For example, a layer of photo lacquer 13 (FIG. 4) is applied on the surface of the metal layer 12. This photo lacquer layer is exposed through a photo mask which has the structure corresponding to the shape of the electrodes to be formed. When the lacquer layer is developed, those parts of the lacquer layer which overlie the area of the surface 20 of the substrate in which the light conductors are to be formed will be removed.

The photo lacquer 13 can be either a negatively acting or a positively acting photo lacquer and the thickness of the photo lacquer layer 13 is, for example, 0.6 μm. In the case of a negatively acting photo lacquer, the unexposed parts of the photo lacquer layer will be eliminated during development and thus the mask used during exposure must be a negative reproduction of the shape of the electrodes 4, 5 and 6 which are to be formed in the composite metallized layer. It should be noted that a negative reproduction of the shape of the electrodes will be a positive reproduction of a shape of the light conductors to be formed. In the case of the positive acting photo lacquer, such as Shipley AZ 1350, the exposed parts of the photo lacquer will be eliminated during development and, therefore, the mask used during exposure must be a positive reproduction of the shape of the electrodes being formed or a negative reproduction of the shape for the light conductors that are to be formed.

Figure 5:
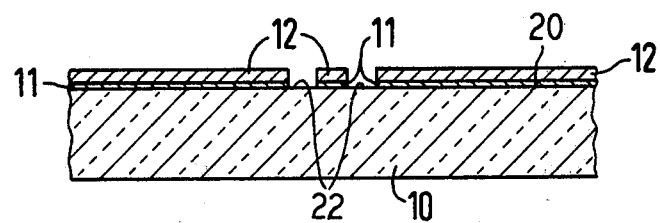

After development of the exposed photo lacquer, one obtains a lacquer layer 13 which covers the entire surface of the metal layer 12 with the exception of surface zones or areas 21 at which the later formed light conductors are to be located. The uncovered zones or exposed surfaces 21 of the metal layer 12 and possibly the underlying adhesive layer 11, if present, are etched away. This can be effected, for example, by sputtering, ion beam or a chemical etching technique. After completion of the step of etching, the metallized layer consisting of the metal layer 12 by itself or with the adhesive layer 11 will have the desired shape for the electrodes 4, 5 and 6 and will leave exposed areas 22 (FIG. 5) of the surface 20 of the substrate 10.

The next step of the method is to produce the light conductors. These light conductors can be formed by diffusing a metal such as titanium or nickel into the exposed or uncovered zones 22 of the surface 20 of the substrate 10.

Figure 6:
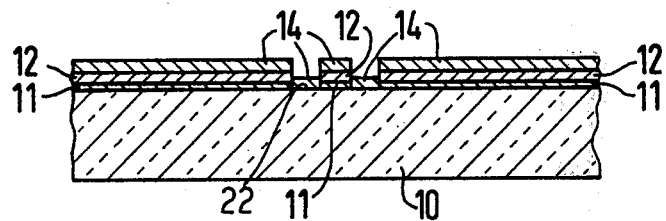

In the preferred embodiment of the invention, the step of diffusing includes applying a layer 14 of the diffusion material on the metal layer 12 and on the exposed portions or areas 22 of the surface 20 of the substrate 10 (FIG. 6). The layer 14 will have a thickness of approximately 30 nm and the material is selected from the group consisting of titanium or nickel in the case of LiNbO₃ and titanium or niobium in the case of LiTaO₃. During a heating process, this diffusion material of the layer 14 will diffuse into the uncovered surface zone areas 22 of the substrate 10. When either titanium or nickel are used as the diffusion material, this diffusion can be effected by heating the substrate to 850° C. to 980° C. and holding that temperature for approximately 3 hours.

Figure 7:
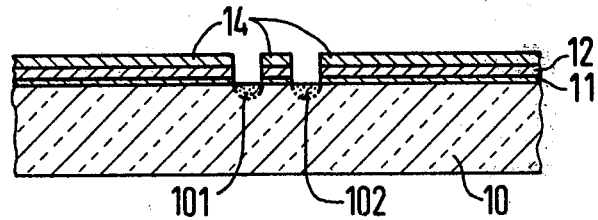

As illustrated in FIG. 7, doped regions 101 and 102 are formed by the diffusion process. These regions 101 and 102 will form the light conductors or waveguides 2 and 3 of the device illustrated in FIG. 1.

The diffusion material of the layer 14, which lies on the metal layer 12 can remain, if desired. If the layer 14 on the metal layer 12 is oxidized during the diffusion process, it can be removed by etching. This etching process can consist of chemical, sputtering or ion etching. For example, if the diffusion layer 14 is composed of titanium, an acid may be used for etching the titanium dioxide from the metal layers 12.

At the completion of the method, the structure of the device 9 is produced. It will be clear that the method of producing the structure or device 9 does not require any expensive aligning steps and that the electrodes 4, 5 and 6 are automatically aligned relative to the light conductors 2 and 3.

During the process of diffusing the diffusion material 14 which is in contact with the surface area 22 of the substrate 10 to form the conductors 101 and 102, either the material of the adhesive layer 11, if present, or in the absence of the adhesive layer 11, the metal of the layer 12 will also diffuse into the substrate 10. This effect is advantageous and thus the light conductors which are formed in the substrate are so-called rib or slab coupled waveguides in which the most highly doped zones of the light conductors 101 and 102 (FIG. 7) extend the greatest distance or depth into the substrate 10. In this way, a good coupling between adjacent light conductors 2 and 3 (FIG. 1) is achieved and the coupling enables the distance between the two light conductors to be relatively great.

However, slab coupled waveguides are not satisfactory for conducting light through a sharp curve or bend having a small radius of curvature and, therefore, slab coupled waveguides are not suitable for use in a device which has waveguides which have curves or bends with a small radius of curvature. In those applications in which the light conductors have sharp curves or bends which are of a small radius of curvature, it is therefore expedient to provide a dielectric layer 23 (as shown in broken lines in FIG. 2) on the surface 20 of the substrate 10 before applying the metallized layers which comprise either the metal layer 12 along or with the adhesive layer 11. The dielectric layer 23, which may consist of glass that has a high melting point or $SiO_2$ or $Si_3N_4$, typically 0.2 to 1 μm thick, can be provided on the surface 20 of the substrate 10 either by vapor depositing or by sputtering. This dielectric layer 23 will prevent the diffusion of the material of the adhesive layer 11 or the metal of the layer 12 and, therefore, will prevent the formation of slab coupled waveguides so that the light conductors which are formed during the diffusion process may have many curves and may have curves with a small radius of curvature.

Although various minor modifications may be suggested by those versed in the art, it should be understood that we wish to employ within the scope of the patent warranted hereon, all such modifications as reasonably and properly come within the scope of our contribution to the art.

We claim:

1. A method of forming a light conductor structure having a pair of light conductors embedded in a substrate consisting of electro-optical materials and said substrate having three electrodes with one electrode being arranged between the light conductors which are between the other two electrodes, said structure being particularly adapted for use as an electrically controllable coupler, said method comprising the steps of providing a substrate, applying three metal electrodes on a surface of the substrate with the three electrodes leaving a pair of exposed portions of said surface, and producing the pair of light conductors on the substrate by doping the pair of exposed portions of the surface of the substrate using the electrodes as a doping mask.

2. A method according to claim 1, wherein the step of doping comprises diffusing a material into the exposed portions of the surface of the substrate.

3. A method according to claim 1, wherein the step of doping comprises diffusing a material selected from a group consisting of titanium, niobium or nickel.

4. A method according to claim 1, wherein the substrate is an electro-optical material selected from a group consisting of lithium niobate and lithium tantalate.

5. A method according to claim 1, wherein the step of applying the electrodes comprises applying a layer of metal selected from a group consisting of gold, platinum, nickel-chromium or titanium-gold alloys.

6. A method according to claim 1, wherein the step of applying the electrodes comprises applying an adhesive layer to the surface of the substrate, and applying a metal layer on the adhesive layer.

7. A method according to claim 6, wherein the material of the adhesive layer is a material selected from a group consisting of titanium, chromium, nickel-chrome compounds, nickel-chrome alloys, or niobium or tantalum.

8. A method according to claim 6, wherein the step of applying the electrodes includes applying a dielectric layer on the substrate beneath the adhesive layer so that during the doping step the material of the adhesive layer and metal layer do not diffuse into the substrate.

9. A method according to claim 1, wherein the step of applying electrodes includes applying a dielectric layer prior to applying a metal layer so that the metal layer does not diffuse into the substrate during the doping step.

10. A method according to claim 1, wherein the step of applying electrodes comprises applying a metal layer to the entire surface of the substrate, applying a layer of photo lacquer material on the metal layer, exposing the photo lacquer layer with an appropriate mask, developing the photo lacquer layer to uncover the metal layer in the areas where electrodes are not desired so that the metal layer in the areas of the desired electrodes remain covered, etching the uncovered areas of the metal layer to expose the surface of the substrate, and then removing the remaining photo lacquer layer.

11. A method according to claim 10, wherein the doping comprises applying a diffusion material on the exposed portions of the surface of the substrate, heating the substrate to a temperature to cause diffusion of the diffusion material into the substrate to form the light conductors.

12. A method according to claim 10, wherein the step of applying electrodes includes applying an adhesive layer on a surface of the substrate prior to applying the metal layer and wherein the step of etching the exposed metal layer includes etching the adhesive layer directly beneath the exposed metal layer.

13. A method according to claim 10, wherein the step of applying the electrodes includes applying a dielectric layer prior to applying the metal layer, the step of etching the metal layer includes etching the dielectric layer beneath the exposed portion of the metal layer so that during the step of doping the dielectric layer prevents diffusion of the metal layer into the substrate.

* * * * *